Patented Feb. 19, 1935

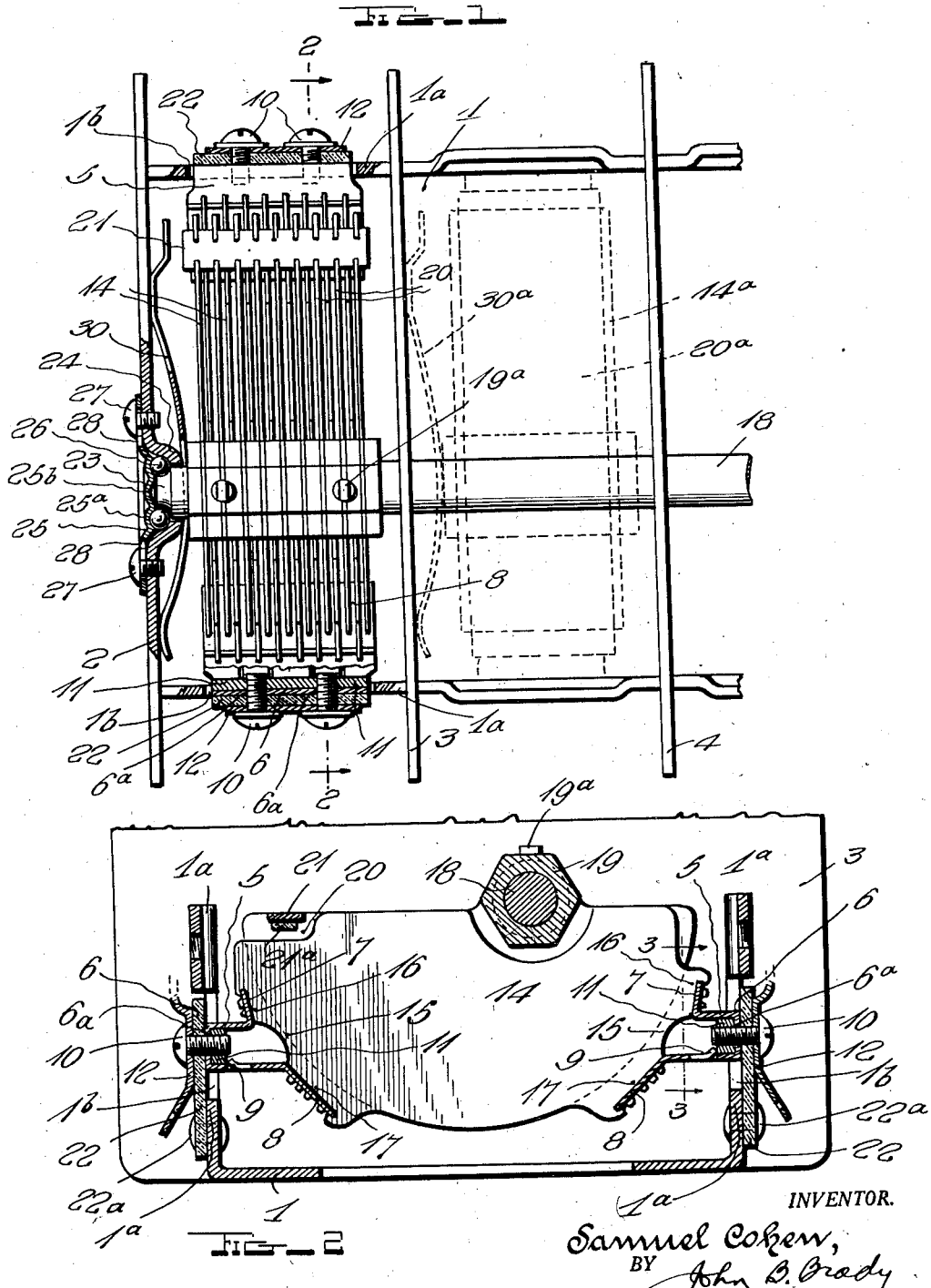

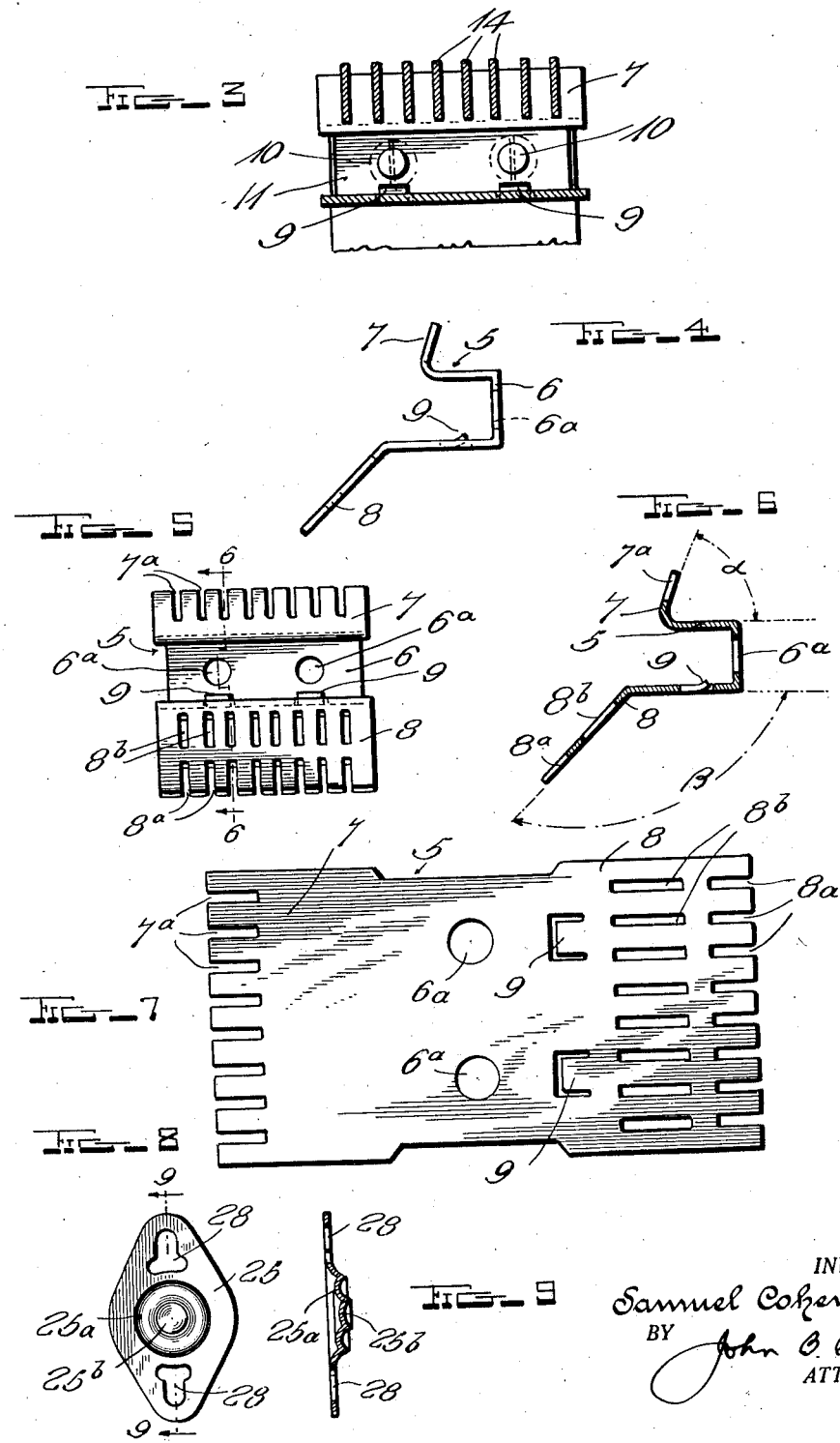

1,992,161

UNITED STATES PATENT OFFICE 1,992,161

VARIABLE CONDENSER

Samuel Cohen, Brooklyn, N. Y., assignor to General Instrument Corporation, New York, N. Y., a corporation of New York Application June 1, 1931, Serial No. 541,466

15 Claims. (Cl. 175—41.5)

My invention relates broadly to variable condensers and more particularly to a construction of mounting for the stator plates of a condenser.

One of the objects of my invention is to provide a construction of support for the stator plates of a variable condenser which is simple in its construction and which effectively mounts the stator plates in fixed spacial relation within the condenser chassis.

Another object of my invention is to provide a construction of comb support for rigidly mounting sets of spacially related stator plates within a condenser chassis.

Still another object of my invention is to provide a channel shaped form of supporting comb for the stator plates of a variable condenser wherein the stator plates are supported at separated points by each of the combs for insuring the maintenance of the spacial relation thereof.

A further object of my invention is to provide a construction of channel shaped comb for mounting sets of stator plates in spaced parallel relation where the comb embraces the oppositely directed edges of the stator plates and extends to positions below the stator plates for effectively mounting the stator plates in fixed spacial relation within the condenser chassis.

A still further object of my invention resides in a construction of ball bearing race for journaling the end of the rotatable shaft of a variable condenser and maintaining the shaft in alignment with the ball bearings, at the same time providing means for readily lubricating the ball bearings.

Other and further objects of my invention reside in the mounting of the rotor and stator plates of a variable condenser and in the construction of the mounting means for such plates as set forth more fully in the specification hereinafter following by reference to the accompanying drawings, wherein:

Figure 1 is a plan view showing the variable condenser construction of my invention; Fig. 2 is a lateral cross-sectional view through the condenser chassis and the mounting means for the stator plates therein; Fig. 3 is a cross-sectional view taken on line 3—3 of Fig. 2 showing the arrangement of stator comb which supports the edges of the stator plates; Fig. 4 is an end view of the stator comb; Fig. 5 is an elevational view looking toward the interior of the channel portion of the stator comb; Fig. 6 is a cross-sectional view through the stator comb taken on line 6—6 of Fig. 5; Fig. 7 is a plan view of the stator comb showing the manner in which the stator comb is blanked out prior to the channeling operation; Fig. 8 is an elevational view of the end plate member which encloses the ball race in which the rotor shaft of the variable condenser is journaled; and Fig. 9 is a cross-sectional view through the ball race and plate taken on line 9—9 of Fig. 8.

I have found the method of assembly of the stator and rotor plates of a variable condenser as set forth herein highly practical and successful. The channel form of stator comb is particularly desirable and is highly practical for insuring the rigid mounting of the stator plates in predetermined spacial relation. The channel shaped stator comb of my invention is very practical for quantity production and assembly operations, thereby decreasing the unit cost on parts of the condenser structure and rendering the assembly less expensive than has been obtained in structures heretofore available.

Referring to the drawings in detail, reference character 1 designates a condenser chassis having laterally extending plate members 2, 3, 4, etc. establishing electrostatic shields between the condenser plates in a multiple condenser system. The condenser chassis is provided with side wall portions 1a, each of which are apertured in directly opposite positions as shown at 1b. An insulated panel member 22 is connected at the lower edge thereof by means of rivets 22a with the sides 1a of the condenser chassis as illustrated. The panels 22 extend upwardly adjacent the apertured portions 1b of the sides 1a of the chassis 1 and provide insulated supports for the sets of stator plates 14.

The channel shaped stator comb has been indicated by reference character 5 having an upwardly directed angularly disposed portion 7 and a downwardly directed angularly disposed portion 8, which are interconnected by the channel shaped portion 6. It will be observed that the upwardly extending portion 7 extends at an acute angle $\alpha$ with respect to the top horizontally extending portion of the channel shaped portion 6 whereas the downwardly depending portion 8 is disposed at an obtuse angle $\beta$ with respect to the horizontally extending portion of the channel shaped portion 6. The upwardly extending portion 7 is slotted at 7a to provide a support for lugs 16 formed on the sets of stator plates 14. The portion 8 of the stator comb is provided with longitudinally extending apertures 8b in the position shown and aligned slots 8a in the position shown for engaging lugs 17 formed on the stator plates 14 as shown in Fig. 2. The channel shaped stator comb 6 is provided with a pair of upstruck lugs 9 in the lower portion thereof as illustrated in Figs. 5 and 6 for maintaining screw threaded block member 11 in position therein. Furthermore, the upstruck tongues 9, bearing against block 11, tend to secure the block in a substantially fixed relation within the U-shaped portion of the member 5 and thus materially aid in a quick assembly of the organization. The screw threaded block members 11 are engaged by screws 10 which pass through the connecting lugs 12 and through the insulated panels 22 through apertures 6a in the channel shaped comb 5 and into the screw threaded apertures in the blocks 11. The upstruck lugs 9 enable the screw threaded blocks 11 to be maintained in position while the screws 10 are being assembled through the upstanding insulated panel 22.

In Fig. 7 the development of the blanks for the stator comb is illustrated indicating the manner in which the stator comb may be blanked out by a stamping operation.

The rotor plates 20 which are interleaved with the stator plates 14 are carried on a sleeve member 19 which is secured by means of screw members 19a to rotatable shaft 18. The rotor plates 20 are keyed in predetermined spacial relation by member 21 having insulated strip 21a extending parallel thereto. The shaft 18 is tapered at 23 and projects through the housing 24 in plate member 2 and is journaled therein by means of ball bearings 26. The ball bearings are confined within the housing 24 in a raceway defined by the end plate member 25 shown more clearly in Figs. 8 and 9. The end plate member 25 is apertured by means of T-shaped slots 28 adjacent opposite ends of the plate, which slots are engaged by screws 27 for adjustably mounting the plate member 25 with respect to the end plate 2 of the condenser chassis. The plate member 25 has an annular raceway 25a pressed therein and a central projecting portion 25b pressed therein as shown, whereby the ball bearings 26 are confined in their path of travel around the shaft 18 and the entire ball bearing race protected from dust and other foreign matter. Plate 25 not only retains balls 26 in the ball race 24 but by virtue of the T-shaped slot will adjust itself automatically to any inaccuracy in manufacturing and wear, and incidentally these slots serve as a path for oil, lubricating the ball bearings. It will also be noted that, after tightening the fastening screws 27 the inherent tendency of the thin retaining plate to press inwardly will tend to positively center the balls within their ball race and since they co-act with the cone shaped end of shaft 18 will keep the shaft from wobbling and thus prevent disastrous disalignment of rotor and stator.

The suspension of the stator plates within the condenser chassis is extremely rigid. The stator unit prior to assembly is of rigid structure by virtue of the double bracing which is provided at separated angularly disposed positions around the stator plates. The upstanding portions 7 of the stator combs are secured to lugs 16 of the stator plates 14 in diametrically opposite positions. The depending portions 8 of the stator combs extend beneath the sets of stator plates 14 thereby providing a rigid bridge-like anchorage for the sets of stator plates and are secured to sets of lugs 17 which are spaced from the lugs 16 by the curved edge portions 15. The stator combs therefore comprise two members which are the sole spacing means for the stator plates, forming therewith a rigid stator assembly unit, and which provide means for supporting the stator plate assembly. Each of these members thus consists of a middle chassis supported portion, an upwardly extending portion secured to the side edges of the stator plates and an angularly disposed portion extending downwardly and inwardly from the middle portion and secured to underneath edges of the stator plates. With this construction and arrangement, the upwardly extending and the downwardly and inwardly extending portions of both stator supporting members engage and are secured to the peripheral edges of the stator plates at spaced intervals around the periphery of the stator plate assembly. It is understood that the sets of stator and rotor plates are mounted laterally of the condenser chassis, one section of which has been shown in full line and an adjacent section in dotted lines. Resilient members 30 and 30a are connected to the laterally extending plate members 2 and 3 of the condenser chassis and embrace the shaft 18 and bear against the ends of the sleeve members 19 for insuring good electrical connection between the condenser chassis and each of the sets of rotor plates and also introducing that degree of friction necessary to maintain the rotor plates in any selected angular position.

The condenser construction of my invention has proven highly practical in quantity production and while I have described my invention in a certain preferred embodiment, I desire that it be understood that modifications may be made and that no limitations upon my invention are intended other than are imposed by the scope of the appended claims.

What I claim as new and desire to secure by Letters Patent of the United States is as follows:

1. Supporting means for the stator plates of a variable condenser comprising a channel shaped member extending transversely to the ends of each of the stator plates, said channel shaped member having upwardly and downwardly directed flanges along their inner side edges, lugs formed on end portions of the peripheral edges of the stator plates and spaced from each other around the peripheries thereof, the upwardly and downwardly directed flanges of the channel shaped members being formed with seats for receiving the lugs on said stator plates and maintaining said plates in rigid transverse spacial relation to each other.

2. Supporting means for the stator plates of a variable condenser, comprising a channel shaped member extending transversely to the opposite ends of the stator plates, each channel shaped member having a pair of horizontally extending walls having their outer side edges connected by a vertically extending wall and a pair of angularly disposed flanges projecting upwardly and downwardly from inner side edges of the horizontally extending walls, and lugs formed at ends of the stator plates at spaced intervals on the peripheral edges of said stator plates, slots being formed in the flanges of said channel members for receiving the lugs on the peripheral edges of said stator plates, the lugs being engaged in said slots for securing said stator plates in predetermined spacial relation between each of the channel members.

3. Supporting means for the stator plates of a variable condenser, comprising a channel shaped member extending transversely to the opposite ends of the stator plates, each channel shaped member having a pair of horizontally extending upper and lower walls connected by a vertically extending outer wall and a pair of angularly disposed flanges projecting from inner edges of the upper and lower walls, each flange having transversely spaced slits leading from its free side edge and the lower flange having other slits spaced inwardly from its outer slits, and lugs disposed at spaced intervals around the peripheries of said stator plates and engaged through the slits of the flanges of said channel members for maintaining said stator plates in predetermined spacial relation.

4. In a condenser, a condenser chassis, a set of stator plates, and means for supporting said stator plates transversely of the condenser chassis, comprising insulated panels each connected with opposite sides of the condenser chassis, channel members disposed longitudinally of the condenser chassis, each channel member consisting of a sheet metal blank bent to form a pair of horizontally extending upper and lower walls having their outer edges connected by a vertically extending wall, the lower wall carrying tongues disposed in spaced relation to its edges and bent upwardly with their free ends facing the vertical wall, a screw threaded member in said channel member engaged between the free ends of said tongues and the vertical wall of the channel member and spaced from the inner edges of the upper and lower walls, and screws extending through said insulated panels, through the vertical wall portion of each channel member and through the screw threaded means carried thereby, for maintaining said channel members in rigid connection with the opposite sides of the condenser chassis, end portions of the blank being bent to form upper and lower flanges extending from the inner side edges of the horizontally extending walls of each of said channel members for engaging the peripheral edges of said stator plates at spaced intervals around the periphery thereof and supporting the stator plates between the channel members.

5. In a condenser, a condenser chassis, a set of stator plates, and means for supporting said stator plates transversely of the condenser chassis comprising insulated panels connected with opposite sides of the condenser chassis, channel members disposed longitudinally of the condenser chassis, each channel member having a pair of horizontally extending portions having their outer edges connected by a vertically extending wall, tongues struck from the lowermost horizontally extending portion and extending upwardly with their free ends facing the vertical wall, a screw threaded member fitting within the channel member and engaged between the free ends of the tongues and the vertically disposed wall of the channel member, screws extending through said insulated panels, through the vertical wall portion of each channel member and through the screw threaded means carried thereby for maintaining said channel members in rigid connection with the opposite sides of the condenser chassis, and angularly disposed flanges extending upwardly and downwardly from the inner edges of the horizontally extending portions of each of said channel members, one of said flanges projecting at an acute angle with respect to the adjacent horizontally extending portion and the other extending downwardly at an obtuse angle with respect to the lowermost horizontally extending portion, and lugs disposed at spaced intervals on the peripheries of said stator plates and engaged by the flanges of said channel members for maintaining the stator plates in predetermined spacial relation.

6. A support for a stator plate unit of a variable condenser comprising a pair of oppositely disposed channel shaped devices, a set of spacially related stator plates having oppositely extending lugs on the edges thereof, each of said channel shaped devices having portions extending parallel to each other and portions of different lengths directed away from each other on differing angular inclinations, the said last mentioned portions engaging the lugs on the said stator plates for maintaining the said stator plates in rigid spaced relation between said channel shaped devices.

7. In a variable condenser, a condenser chassis having insulated plates at opposite sides thereof, a set of stator plates, channel shaped members extending normal to the opposite ends of said stator plates, each channel shaped member having oppositely extending portions connected with the walls thereof and inclined at different angles to the planes of the walls of said members, the said portions engaging the peripheral edges of said stator plates, blocks secured in said channel shaped members and spaced from the stator plates, and means extending through said insulated plates and through said channel shaped members and secured in said blocks for maintaining said stator plates in rigid spacial relation within the condenser chassis.

8. Supporting means for the stator plates of a variable condenser comprising channel shaped members extending transversely to each end of a set of stator plates, said channel shaped members having portions thereon extending in plane surfaces, one pair of corresponding plane surfaces of said channel shaped members extending parallel to each other and the other pair of plane surfaces in said channel shaped members being directed away from each other, the said last mentioned plane surfaces being slotted to receive lugs on the ends of the stator plates and forming supports for maintaining the stator plates in rigid spacial relation.

9. Supporting means for the stator plates of a variable condenser comprising channel shaped members extending transversely to each end of a pair of stator plates, said channel shaped members having portions thereon extending in plane surfaces, one pair of corresponding plane surfaces on said channel shaped members extending parallel to each other and another pair of said plane surfaces extending in opposite directions, one of said last mentioned plane surfaces extending on an angle which is obtuse and the other of said last mentioned plane surfaces of said channel shaped members extending on an angle which is acute with respect to the parallel plane surfaces of said channel shaped members.

10. Supporting means for the stator plates of a variable condenser comprising channel shaped members extending transversely to the ends of each of the stator plates, means connecting the ends of said stator plates with each of said channel shaped members, a connecting block inserted within each of said channel shaped members, means struck from the material of said channel shaped members for maintaining said connecting blocks in position within said channel shaped members, and means extensible through said channel shaped members and engaging with said connecting blocks for supporting said stator plates.

11. Supporting means for the stator plates of a variable condenser comprising channel shaped members extending transversely to the ends of each of the stator plates, means connecting the ends of said stator plates with each of said channel shaped members, a connecting block inserted within each of said channel shaped members, lugs pressed from one wall of each of said channel shaped members and directed inwardly against the connecting block within each channel shaped member for maintaining said connecting block in position, and means extending through each of said channel shaped members and engaging the said connecting block for supporting said stator plates.

12. Supporting means for the stator plates of a variable condenser comprising channel shaped members extending transversely to the ends of each of the stator plates, means connecting the ends of said stator plates with each of said channel shaped members, a connecting block inserted within each of said channel shaped members, means struck from the material of said channel shaped members for maintaining said connecting blocks in position within said channel shaped members, and means extending through each of said channel shaped members and engaging the said connecting blocks for supporting the said stator plates.

13. Supporting and mounting means for the stator plates of a condenser comprising, in combination with a set of stator plates, of a pair of members for mounting the stator plates in spaced assembled relation and for supporting the stator plates on opposite side walls of the condenser chassis, the said pair of members being the sole spacing means for the stator plates and forming therewith a stator assembly unit and providing means for supporting the stator plate assembly, each of said members comprising a rigid, bridge-like suspension strip extending transversely of the stator plates and consisting of a middle chassis supported portion, an upwardly extending portion secured to the side edges of the stator plates and an angularly disposed portion extending downwardly and inwardly from the middle portion and secured to underneath edges of the stator plates, the said upwardly extending and angularly disposed portions of both members engaging the peripheral edges of said stator plates at spaced intervals around the periphery thereof.

14. Supporting and mounting means for the stator plates of a condenser comprising, in combination with a set of stator plates, of a pair of members for mounting the stator plates in spaced assembled relation and for supporting the stator plates from opposite side walls of the condenser chassis, the said pair of members being the sole spacing means for the stator plates and forming therewith a stator assembly unit and providing means for supporting the stator plate assembly, each of said members comprising a rigid, bridge-like suspension strip extending transversely of the stator plates and consisting of a middle chassis supported portion, an upwardly extending portion secured to the side edges of the stator plates and an angularly disposed portion extending downwardly and inwardly from the middle portion and secured to underneath edges of the stator plates, the said upwardly extending and angularly disposed portions of both members being spaced peripherally about the stator plate assembly, the stator plates and said pair of members being secured together as a unit by means of lugs formed on the edges of the stator plates and spaced peripherally thereabout and apertures in the upwardly extending and angularly disposed portions of said supporting members receiving said lugs.

15. Supporting and mounting means for the stator plates of a condenser comprising, in combination with a set of stator plates, of a pair of members for mounting the stator plates in spaced assembled relation and for supporting the stator plate assembly on the condenser chassis, the said pair of members providing spacing and mounting means for the stator plates and forming therewith a stator assembly unit, each of said members comprising a rigid, bridge-like suspension strip extending transversely of the stator plates and consisting of a middle chassis attaching portion, an upwardly extending portion secured to the side edges of the stator plates and an angularly disposed portion extending downwardly and inwardly from the middle portion and secured to underneath edges of the stator plates, the said upwardly extending and angularly disposed portions of both members engaging the peripheral edges of the said stator plates at spaced intervals around the periphery.

SAMUEL COHEN.